(12) United States Patent
Lee

(10) Patent No.: US 7,007,459 B2
(45) Date of Patent: Mar. 7, 2006

(54) EXHAUST GAS CONTROL DEVICE FOR INTERNAL COMBUSTION ENGINES

(76) Inventor: Ju-Cheol Lee, 175-16 Kyunghyun-dong, Naju-City, 520-120 Jeollanam-Do (KR)

( * ) Notice: Subject to any disclaimer, the term of this patent is extended or adjusted under 35 U.S.C. 154(b) by 413 days.

(21) Appl. No.: 10/433,289

(22) PCT Filed: Oct. 31, 2001

(86) PCT No.: PCT/KR01/01837

§ 371 (c)(1), (2), (4) Date: Jun. 2, 2003

(87) PCT Pub. No.: WO02/46586

PCT Pub. Date: Jun. 13, 2002

(65) Prior Publication Data

US 2004/0060283 A1    Apr. 1, 2004

(30) Foreign Application Priority Data

Dec. 5, 2000   (KR) ...................... 10-2000-0087641

(51) Int. Cl.
*F01N 5/00*   (2006.01)
(52) U.S. Cl. ............................. 60/281; 60/278; 60/297; 60/298
(58) Field of Classification Search ................ 60/278, 60/281, 287, 288, 297, 298, 320
See application file for complete search history.

(56) References Cited

U.S. PATENT DOCUMENTS

| | | | | | |
|---|---|---|---|---|---|
| 3,464,801 | A | * | 9/1969 | Barstow ...................... | 422/111 |
| 3,645,098 | A | * | 2/1972 | Templin et al. ............... | 60/288 |
| 5,140,811 | A | * | 8/1992 | Minami et al. ............... | 60/297 |
| 5,142,864 | A | * | 9/1992 | Dunne ......................... | 60/274 |
| 5,307,627 | A | * | 5/1994 | Christensen et al. .......... | 60/274 |
| 5,493,859 | A | * | 2/1996 | Shinohara et al. ............ | 60/302 |
| 5,873,242 | A | * | 2/1999 | Morishima et al. ........... | 60/286 |
| 6,122,908 | A | * | 9/2000 | Wirmark ...................... | 60/274 |
| 6,357,227 | B1 | * | 3/2002 | Neufert ........................ | 60/309 |

\* cited by examiner

*Primary Examiner*—Thomas Denion
*Assistant Examiner*—Diem Tran
(74) *Attorney, Agent, or Firm*—Dilworth & Barrese, LLP

(57) ABSTRACT

Disclosed herein is an exhaust gas control device for internal combustion engines. The exhaust gas control device has a main exhaust pipe (3) communicating with an exhaust manifold (2) used for guiding exhaust gas discharged from a combustion chamber (1) of an engine, a catalytic converter (6) arranged on a predetermined position of the main exhaust pipe (3) for purifying unburnt fuel discharged with the exhaust has and having a plurality of sequentially arranged catalyst units (6a, 6b, 6c), and an unburnt fuel collection tank (8) provided with a plurality of cooling fins (9) and connected to the catalytic converter (6) through a branch pipe (7). The collection tank (8) collects purified unburnt fuel after the unburnt fuel is treated by the catalytic converter (6) so as to remove noxious materials therefrom.

4 Claims, 5 Drawing Sheets

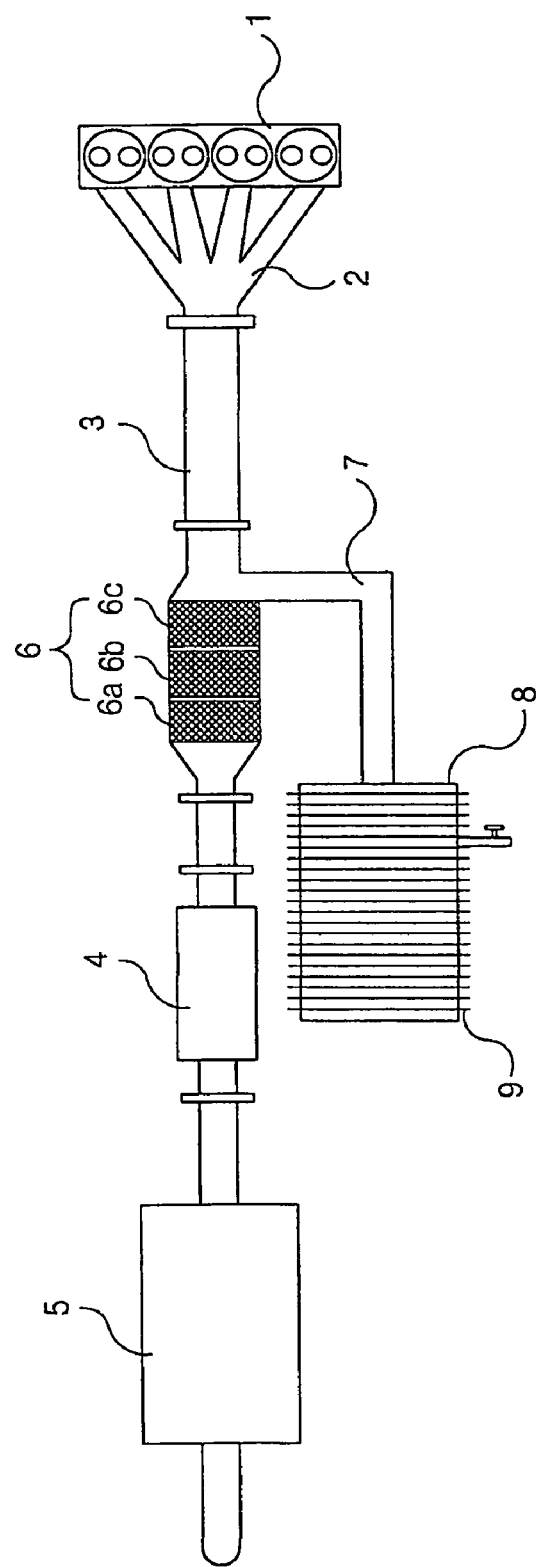
[FIG. 1]

[FIG.2]
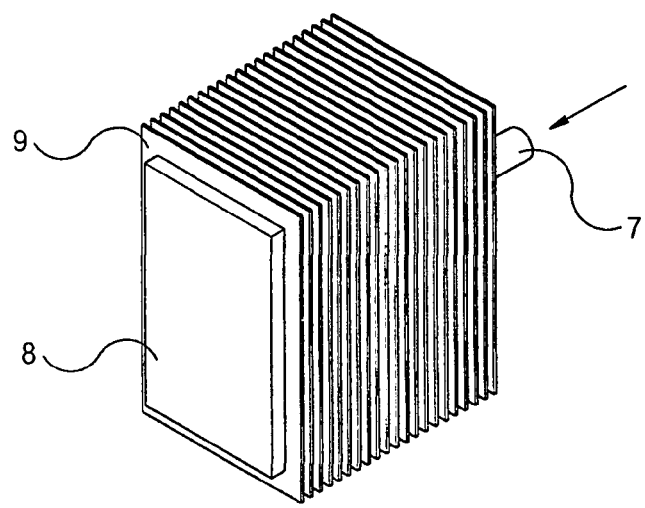
[FIG.3]
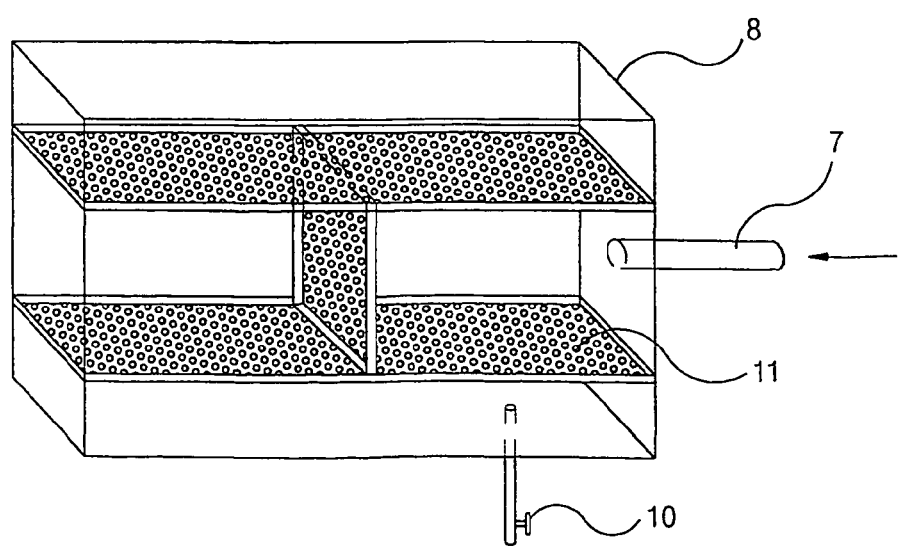

[FIG. 4]
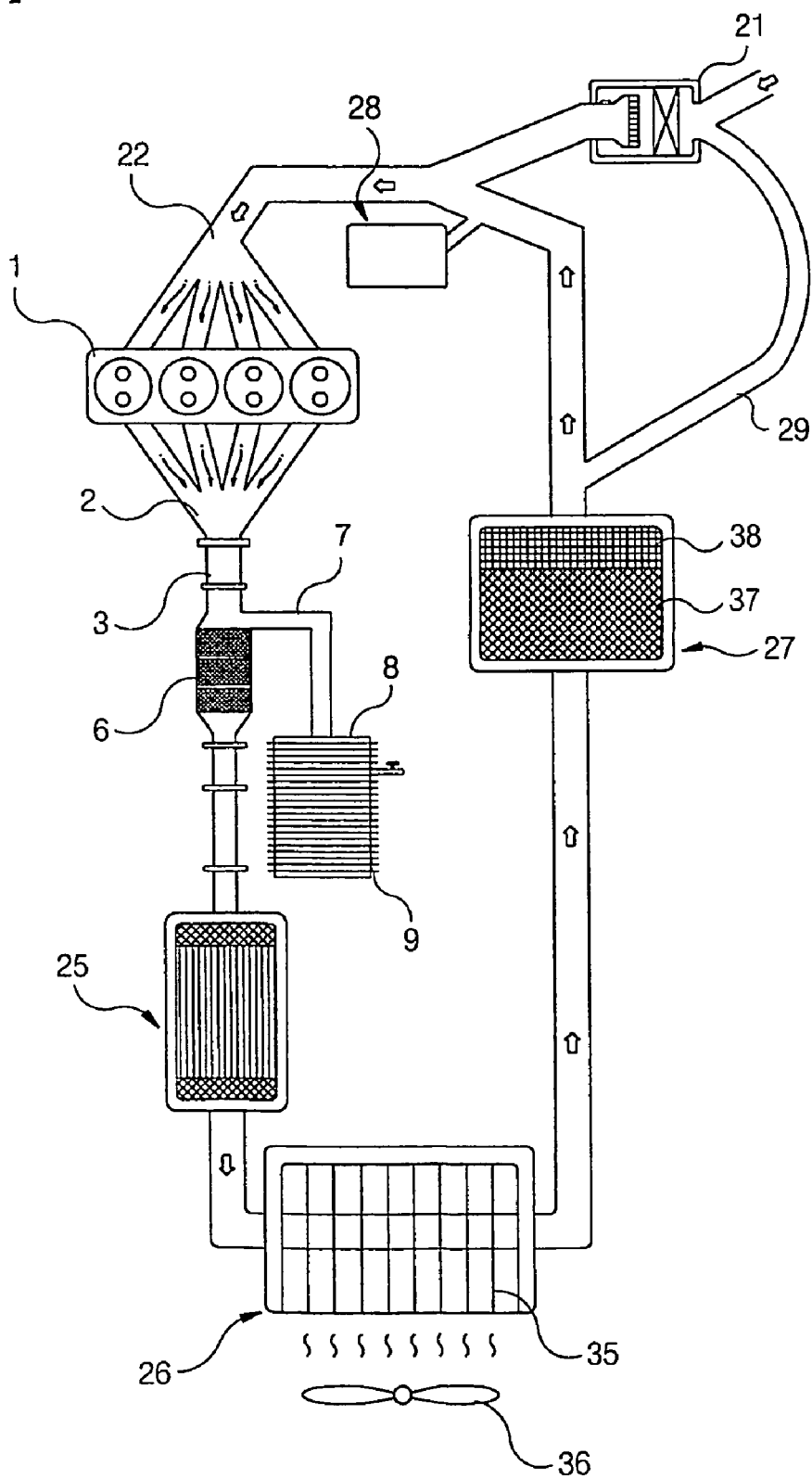

[FIG.5]
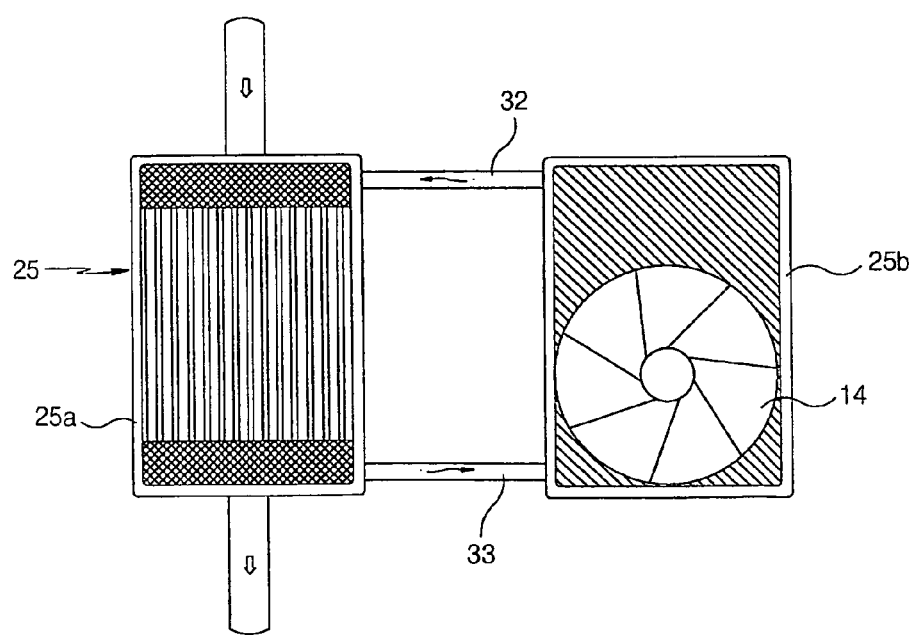

[FIG.6]
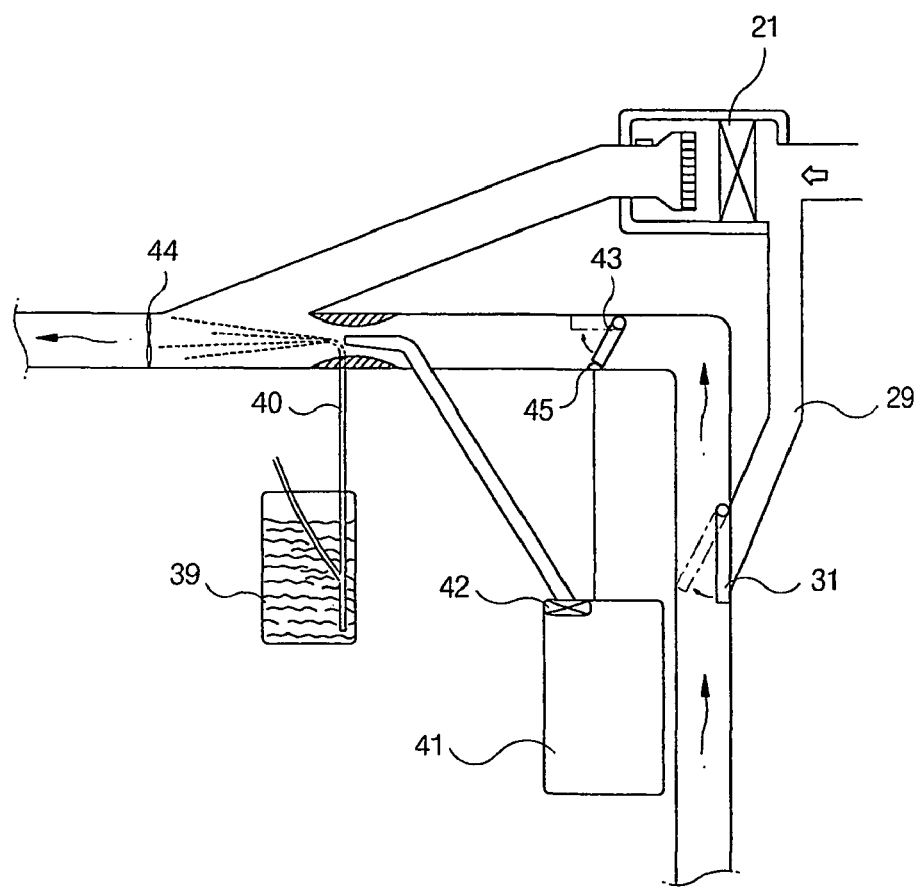

EXHAUST GAS CONTROL DEVICE FOR INTERNAL COMBUSTION ENGINES

TECHNICAL FIELD

The present invention relates generally to an exhaust gas control device for internal combustion engines, and more particularly, to an exhaust gas control device for internal combustion engines, which collects unburnt fuel that may cause environmental pollution when it is discharged with exhaust gas from a combustion chamber of an engine during an operation of the engine, thereby preventing environmental pollution caused by the release of the noxious unburnt liquid materials.

BACKGROUND ART

Generally, gases generated from vehicles are classified into three types according to gas sources, that is, exhaust gas from an exhaust pipe, blowby gas generated from the crank case of an engine, and evaporation gas from a fuel tank or a vaporizer.

Of the gases from vehicles, the exhaust gas is discharged to the atmosphere from the exhaust pipe after fuel is burnt in an engine cylinder, and has a complicated composition consisting of noxious gas components and harmless gas components. The harmless gas components include $H_2O$ and $CO_2$, whereas the noxious gas components include CO, hydrocarbon (HC), $NO_x$, lead compounds and carbon particles. However, the main noxious components that may cause environmental pollution are the $NO_x$, CO and HC. The volume of the discharged noxious gas components varies depending on various parameters including engine dimension, engine running condition, etc.

The blowby gas is discharged from a gap between the piston and the cylinder to the crank case, and is also called crankcase emission. Such blowby gas is a mixture of gases which is composed of 70–95% unburnt gaseous HC, burnt gas and partially oxidized gas. The corrosion of the engine and the degradation of oil are undesirably caused when the blowby gas is left in the crank case. In order to overcome this problem, the crank case is conventionally configured to be sufficiently ventilated and discharge the blowby gas to the atmosphere. However, when using this configuration, the content of the noxious HC in the discharged blowby gas is undesirably high, and thus it is necessary to discharge the blowby gas to the atmosphere after reburning the blowby gas.

When the exhaust gas is directly discharged to the atmosphere through an exhaust pipe, the volume of discharged sooty smoke and noxious gas is relatively small when the engine is driven at low speeds under 1,500 RPM, whereas the volume of the discharged exhaust gas is increased at high speeds above 1,500 RPM, so the volume of the discharged sooty smoke and noxious gas included in the exhaust gas is undesirably increased, with the sooty smoke and noxious gas being the principal cause of air pollution.

The exhaust gas discharged to the atmosphere is problematic in that a variety of noxious components of the exhaust gas including carbon monoxide, hydrocarbon, sulfur, nitrous oxide, aldehyde and suspended particles, are discharged to the atmosphere. In order to prevent such noxious components from being produced in the internal combustion engine, the combustion rate of fuel in the internal combustion engine must be increased, and an exhaust gas control device is required to be installed, in addition to a requirement to treat unburnt materials, and prevent evaporation of fuel.

Since it is impossible to completely burn the fuel in the engine cylinder of a vehicle, a variety of noxious liquid components contained in the exhaust gas produced from the internal combustion engine are discharged to the atmosphere along with other components of the exhaust gas.

Such noxious liquid components discharged with other components of the exhaust gas are converted to sooty smoke or carbon while being attached to the inner wall of the exhaust pipe due to its having a lower temperature than the combustion chamber. A diesel engine has a problem that it does not use a catalytic converter at the exhaust pipe, so the non-purified exhaust gas is directly discharged to the atmosphere and causes air pollution.

DISCLOSURE OF THE INVENTION

Accordingly, the present invention has been made keeping in mind the above problems occurring in the prior art, and an object of the present invention is to provide an exhaust gas control device for internal combustion engines, which not only reduces the volume of unburnt fuel discharged to the atmosphere during an operation of an engine, but also inhibits noxious materials contained in the exhaust gas from being discharged to the atmosphere, thereby minimizing environmental pollution.

In order to accomplish the above object, the present invention provides an exhaust gas control device comprising a main exhaust pipe communicating with an exhaust manifold used for guiding exhaust gas discharged from a combustion chamber of an engine, a catalytic converter arranged on a predetermined position of the main exhaust pipe for purifying the noxious materials of unburnt fuel discharged with the exhaust gas and having a plurality of sequentially arranged catalyst units, and an unburnt fuel collection tank connected to the catalytic converter through a branch pipe and provided with a plurality of cooling fins, whereby the collection tank collects purified unburnt fuel after the unburnt fuel is treated by the catalytic converter so as to remove noxious materials therefrom.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view showing the overall construction of an exhaust gas control device according to the first embodiment of the present invention;

FIG. 2 is a perspective view of an unburnt fuel collection tank included in the exhaust gas control device of FIG. 1;

FIG. 3 is a view of the inside of the unburnt fuel collection tank included in the exhaust gas control device of FIG. 1;

FIG. 4 is a schematic view showing the overall construction of an exhaust gas control device according to the second embodiment of the present invention, which has a return channel;

FIG. 5 is a detail view of a water-cooled cooling unit included in the exhaust gas control device of FIG. 4; and FIG. 6 is an enlarged view of a water supply unit and an exhaust gas guide passage included in the exhaust gas control device of FIG. 4.

BEST MODE FOR CARRYING OUT THE INVENTION

Reference now should be made to the drawings, in which the same reference numerals are used throughout the different drawings to designate the same or similar components.

FIGS. 1 to 3 illustrate the construction of an exhaust gas control device according to the first embodiment of the present invention.

As shown in the drawings, the exhaust gas control device for internal combustion engines comprises a combustion chamber 1 of an engine, an exhaust manifold 2, a main exhaust pipe 3 provided with a plurality of mufflers 4, 5 and with a catalytic converter 6 having a plurality of sequentially arranged catalyst units 6a, 6b and 6c, and an unburnt fuel collection tank 8 connected to the catalytic converter 6 through a branch pipe 7 for collecting purified unburnt fuel after the unburnt fuel is treated by the catalytic converter 6 so as to remove noxious materials therefrom. In the catalytic converter 6, the perforations of the catalyst units 6a, 6b and 6c are gradually reduced in their sizes.

Referring to FIG. 2, the unburnt fuel collection tank 8 is provided with a plurality of cooling fins 9 for reducing the temperature of the inside of the main exhaust pipe 3, and is provided on its lower portion with a drain cock 10 for selectively discharging liquid fuel to the atmosphere while collecting the purified unburnt fuel (hereinafter, referred to simply as the "purified liquid"). As shown in the FIG. 3, the collection tank 8 is provided on its interior with an H-shaped sound arresting plate 11 having a plurality of perforations for attenuating the noise of inlet exhaust gas.

The process of discharging the exhaust gas through the exhaust gas control device of the present embodiment will be described in the following.

The exhaust gas is primarily guided from the combustion chamber 1 through the exhaust manifold 2 to the main exhaust pipe 3. Thereafter, the exhaust gas passes through the catalytic converter 6 and its mufflers 4, 5, and finally is discharged to the atmosphere.

Unburnt fuel is contained in the high temperature exhaust gas from the combustion chamber 1 of the engine, and vaporized in the catalytic converter 6 heated by the high temperature exhaust gas, so that the noxious materials are collected in the catalytic converter 6. After being vaporized, remaining purified liquid is guided to the collection tank 8.

The catalytic converter 6 is required to have a sufficient temperature, and the unburnt fuel is required to remain in the catalytic converter 6 for a sufficient time to ensure complete reaction of the unburnt fuel.

The high temperature exhaust gas passes through the catalytic converter 6 having a plurality of sequentially arranged catalyst units 6a, 6b and 6c, so the exhaust gas remains in the catalytic converter 6 for a longer period of time. Thus, the exhaust gas and the unburnt gas are more effectively purified in the catalytic converter 6 due to the proper reaction temperature and time that the gas remains in the catalytic converter 6.

Furthermore, the sequentially arranged catalyst units 6a, 6b and 6c have perforations gradually decreasing in size, so the catalyst units 6a, 6b and 6c more effectively process the unburnt noxious gas.

The collection tank 8 provided with a plurality of cooling fins 10 is maintained at a lower temperature than that of the inside of the main exhaust pipe 3. Since the purified liquid treated by the catalytic converter 6 flows into the collection tank 8 having the relatively lower temperature through the branch pipe 7, the liquid can be prevented from being discharged to the atmosphere.

The temperature of the exhaust gas discharged through the exhaust line of the exhaust gas control device varies depending on an engine driving mode and atmosphere. That is, in general, the temperature of the exhaust gas measures 120° C. in case of no-load operation of the engine, whereas its temperature measures 750° C. when the speed of the engine reaches 3,500 rpm.

The temperature of the collection tank 8 is reduced through a heat exchange process of the cooling fins 9, until it reaches 60° C.~350° C. The difference between temperatures of the collection tank 8 and the main exhaust pipe 3 changes depending on the rpm of the engine, but the difference usually ranges from 100° C. to 450° C.

Since the purified liquid treated by the catalytic converter 6 flows into the collection tank 8 due to such a difference in temperature, the amount of noxious gas, such as sooty smoke and carbon discharged through the main exhaust pipe 3 to the atmosphere is considerably reduced, thereby minimizing air pollution.

In addition, the noise generated by the exhaust gas entering the collection tank 8 is reduced by the sound arresting plate 11, thereby reducing the operating noise of the exhaust gas control device.

The purified liquid collected in the collection tank 8 may be selectively discharged to a drain tank by opening the drain cock 10, thereby preventing environmental pollution.

FIGS. 4 to 6 illustrate the exhaust gas control device according to the second embodiment of the present invention, which includes a return channel.

In FIG. 4 showing the overall construction of the exhaust gas control device, the combustion chamber 1 is provided on its one end with an intake manifold 22 connected to an air cleaner 21, and on its opposite end with an exhaust manifold 2. A main exhaust pipe 3 communicating with the exhaust manifold 2 comprises a catalytic converter 6, a branch pipe 7 and an unburnt fuel collection tank 8, similarly to the Construction of the first embodiment.

According to the second embodiment of the present invention, the main exhaust pipe 3 is additionally provided with a return channel, so the exhaust gas is repeatedly guided to the intake manifold 22.

The return channel is comprised of a water-cooled cooling unit 25 for primarily cooling the high temperature exhaust gas by using refrigerant, an air-cooled cooling unit 26 for additionally cooling the exhaust gas through a heat exchange process using air, a filter unit 27 for removing foreign materials from the exhaust gas condensed by a cooling process, and a water supply unit 28 for supplying water to the exhaust gas returning through the return channel from the filter unit 27 to the intake manifold 22. An outlet pipe 29 is branched from the return channel at a position after the filter unit 27 and connected to an air cleaner 21 for returning a part of purified exhaust gas.

Referring to FIG. 5 showing the water-cooled cooling unit 25, a heat exchange part 25a is connected to a refrigerant reservoir 25b by a plurality of refrigerant guide pipes 32 and 33. The refrigerant reservoir 25b is provided with a cooling pan 34 for cooling the refrigerant having an increased temperature through the heat exchange process.

The air-cooled cooling unit 26 consists of a plurality of radiation fins 35 and a radiation pan 36.

The filter unit 27 is a two-layer structure, consisting of a sooty smoke filter layer 37 for collecting the sooty smoke particles contained in the exhaust gas and a purifying layer 38 using active charcoal for purifying the sooty smoke particles from the filter layer 37.

As shown in FIG. 6, an automatic control valve 31 is installed on the return channel at a position between the filter unit 27 and the water supply unit 28 for selectively opening the outlet pipe 29 branched from the return channel. The water supply unit 28 comprises a water reservoir 39, a nozzle pipe 40, a compressed air tank 41 and a compressed air control pump 42. The exhaust gas control device is provided with a manual control valve 43 which may be selectively opened or closed depending on gas pressure, and a mixing pan 44 for vaporizing the sprayed water.

The operation of the exhaust gas control device according to the second embodiment and the associated effects will be described in the following.

High temperature exhaust gas containing unburnt fuel is discharged from the combustion chamber 1 through the exhaust manifold 2 to the main exhaust pipe 3. The unburnt fuel is collected by the catalytic converter 6, and then the purified liquid is stored in the collection tank 8, thus the primary purification process for the exhaust gas is completed, similarly to the first embodiment.

Most of the exhaust gas purified in this way has a high temperature and passes through the water-cooled cooling unit 25 for the primary cooling treatment. In this case, the chilled water serving as refrigerant circulates in the cooling unit 25 to accomplish the heat exchange process for the exhaust gas.

In the case where the chilled water is supplied from the refrigerant reservoir 25b to the heat exchange part 25a, the refrigerant having a temperature increased through the heat exchange process flows into the refrigerant reservoir 25b along the refrigerant outlet pipe 33, while the refrigerant having a temperature reduced by an operation of the cooling pan 34 in the refrigerant reservoir 25b repeatedly flows into the heat exchange part 25a along the refrigerant inlet pipe 32. Such a water circulating operation is forcibly carried out by means of a water pump (not shown).

The primarily cooled exhaust gas is secondarily cooled by the air-cooled cooling unit 26 so as to be additionally reduced in its temperature. The air-cooled cooling unit 26 is provided on the outer surface of the channel with radiation fins 35, thus accomplishing the heat exchange process by natural convection of air during an operation of the radiation pan 36.

Thereafter, when the exhaust gas guided along the channel passes through the filter unit 27, the large particles of the sooty smoke are filtered at the filter layer 37 whereas the noxious gas is purified by the active charcoal contained in the purifying layer 38. In the case of a low speed operation of the engine (usually, less than 1500~2000 RPM), the exhaust gas is guided from the filter unit 27 through the outlet pipe 29 to the air cleaner 21. On the other hand, in the case of a high speed operation of the engine, a part of the exhaust gas is guided to the air cleaner 21 through the outlet pipe 29, while a remaining part of the exhaust gas is returned to the combustion chamber 1 for reburning. This process is accomplished by means of the manual control valve 43 which will be described hereinafter.

The return channel is provided with the automatic control valve 31 and the manual control valve 43. As shown in FIG. 6, the automatic control valve 31 blocks up the outlet pipe 29 to form the return channel for the exhaust gas during an operation of the engine, and is moved in a direction of the arrow to open the outlet pipe 29 in response to a braking signal from the vehicle, thereby preventing an increase in the rpm of the engine due to a return of the exhaust gas to the combustion chamber 1. When the manual control valve 43 moved by gravity is opened by the pressure of the exhaust gas during a high speed operation of the engine, a return detecting sensor 45 detects the return of the exhaust gas and then transmits a drive signal to the compressed air control pump 42. In the case of a low speed operation of the engine, the pressure of the exhaust gas is decreased, so the manual control valve 43 closes the return channel by gravity, thus the exhaust gas is guided into the air cleaner 21 through the outlet pipe 29 as described above.

The water supplied from the water reservoir 39 through the nozzle pipe 40 is sprayed to the high pressure exhaust gas returned to the combustion chamber 1. The sprayed water is vaporized by heat, so the moisture content contained in the exhaust gas is increased whereas the temperature of the exhaust gas is decreased. The increased water content improves compression efficiency of the combustion chamber, thereby conserving the fuel as well as reducing the amount of sooty smoke. At this time, the water sprayed to the exhaust gas is naturally drawn by a difference between the pressure of the water reservoir 39 and that of the atmosphere. Since the channel is made in the form of a Venturi tube, the desired pressure difference is generated. In order to increase the difference of pressure, compressed air is sprayed from the compressed air tank 41 by the control pump 42 operated in response to a drive signal, thereby more effectively spraying the water. Also, the spray of the water is carried out by an additional pumping means, for example, a motor or a pump.

Thereafter, the moisture-laden exhaust gas guided along the return channel flows into the combustion clamber 1, and is mixed with the inlet gas from the air cleaner 21 by means of the mixing pan 44 installed in the return channel.

According to the second embodiment of the present invention, the noxious unburnt gas contained in the high temperature exhaust gas from the combustion chamber 1 is primarily purified by the catalytic converter 6 and the collection tank 8, and then is secondarily purified by a plurality of the cooling units 25, 26 and the filter unit 27.

In the case of a low speed operation of an engine, the exhaust gas control device entirely discharges exhaust gas to the atmosphere. On the other hand, in the case of a high speed operation of the engine, the exhaust gas control device discharges only a part of the exhaust gas to the atmosphere while returning a remaining part of the exhaust gas to the combustion chamber 1 and reburning the exhaust gas, thereby conserving the fuel.

When the exhaust gas from a cooling process and a filtering process is returned to the combustion chamber 1, the proportion of the moisture contained in the exhaust gas is increased by spraying water to the exhaust gas, thereby preventing overheating of the engine. In this case, the moisture is vaporized by heat, so the compression ratio in the combustion chamber is increased, thereby accomplishing a desired explosion stroke with a small amount of fuel.

As a result, the amount of discharged noxious exhaust gas is extremely reduced, thereby preventing sooty smoke and noxious gas from being discharged to the atmosphere as well as conserving the fuel.

INDUSTRIAL APPLICABILITY

As described above, an exhaust gas control device for internal combustion engines according to the present invention prevents unburnt fuel produced during an operation of the internal engine from being discharged through the muffler to the atmosphere, thereby being less likely to cause environmental pollution as well as effectively removing the noxious exhaust gases, including sooty smoke and carbon.

The present invention is also advantageous in that the energy efficiency of engine is highly improved due to the perfect combustion of the exhaust gas.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An exhaust gas control device for internal combustion engines, comprising:
    a main exhaust pipe communicating with an exhaust manifold used for guiding exhaust gas discharged from a combustion chamber of an engine;
    a catalytic converter arranged on a predetermined position of the main exhaust pipe for purifying unburnt fuel discharged with the exhaust gas, said converter having a plurality of sequentially arranged catalyst units; and
    an unburnt fuel collection tank provided with a plurality of cooling fins and connected to the catalytic converter through a branch pipe,
    whereby the collection tank collects purified unburnt fuel after the unburnt fuel is treated by the catalytic converter so as to remove noxious materials therefrom.

2. The exhaust gas control device according to claim 1, wherein said collection tank comprises an H-shaped sound arresting plate having a plurality of perforations for reducing noise of inlet exhaust gas, and a drain cock for selectively discharging liquid fuel from a lower portion of the collection tank.

3. The exhaust gas control device according to claim 1, wherein said main exhaust pipe having the catalytic converter communicates with a return channel used for returning the exhaust gas to an intake manifold of the combustion chamber, said return channel including:
    a cooling unit for reducing the temperature of exhaust gas discharged through the main exhaust pipe;
    a filter unit for removing noxious materials contained in the exhaust gas from the cooling unit;
    an outlet pipe branched from the return channel at a position after the filter unit and connected to an air cleaner; and
    a water supply unit for supplying water to the exhaust gas returning through the return channel between the filter unit and the intake manifold.

4. The exhaust gas control device according to claim 3 wherein said water supply unit comprises a water reservoir, a nozzle pipe extending from the water reservoir to the return channel, and a compressed air tank for supplying compressed air to the nozzle pipe in response to an operation of a control pump.

* * * * *